US008706073B2

(12) United States Patent
Borsella et al.

(10) Patent No.: US 8,706,073 B2
(45) Date of Patent: Apr. 22, 2014

(54) SYSTEM AND METHOD FOR DYNAMIC ADJUSTMENT OF CLOCK CALIBRATION

(75) Inventors: Remo Borsella, Waterloo (CA); Alan Sung, Waterloo (CA)

(73) Assignee: BlackBerry Limited, Waterloo (CA)

( * ) Notice: Subject to any disclaimer, the term of this patent is extended or adjusted under 35 U.S.C. 154(b) by 396 days.

(21) Appl. No.: 12/485,170

(22) Filed: Jun. 16, 2009

(65) Prior Publication Data

US 2010/0317295 A1     Dec. 16, 2010

(51) Int. Cl.
*H04B 1/16* (2006.01)
*G08C 17/00* (2006.01)
*H04B 1/38* (2006.01)

(52) U.S. Cl.
USPC .................... 455/343.1; 370/311; 455/574

(58) Field of Classification Search
USPC ........ 455/425, 574, 343, 38.3, 502, 208, 255, 455/257, 258, 259, 260, 265, 68, 129, 455/67.11, 522, 117, 73, 121, 127.1, 232.1; 331/176; 375/360; 370/338, 318, 319, 370/321
See application file for complete search history.

(56) References Cited

U.S. PATENT DOCUMENTS

| | | | |
|---|---|---|---|
| 5,940,027 A | | 8/1999 | Forseth et al. |
| 6,029,061 A | * | 2/2000 | Kohlschmidt ................ 455/574 |
| 6,476,682 B1 | * | 11/2002 | Cole et al. ..................... 331/176 |
| 6,545,950 B1 | | 4/2003 | Walukas et al. |
| 2007/0019770 A1 | * | 1/2007 | Bradley et al. ................ 375/360 |
| 2007/0213028 A1 | * | 9/2007 | Shohara et al. ............ 455/343.1 |
| 2008/0222440 A1 | | 9/2008 | Jones et al. |
| 2009/0054075 A1 | * | 2/2009 | Boejer et al. ............... 455/456.1 |

OTHER PUBLICATIONS

Canadian Intellectual Property Office, "Examiner's Requisition" for corresponding Canadian Patent Application No. 2,669,041, dated Feb. 9, 2012, Canada.

* cited by examiner

*Primary Examiner* — Nay A Maung
*Assistant Examiner* — Cindy Trandai
(74) *Attorney, Agent, or Firm* — Norton Rose Fulbright Canada LLP

(57) ABSTRACT

A system for dynamically adjusting clock calibration in a wireless communication device. The system includes a temperature sensor for measuring a temperature, a primary clock coupled to the microprocessor for synchronizing the operation of the wireless communication device and a secondary clock coupled to the microprocessor for tracking time. A signal representing a measured temperature is received. At least one of a temperature measurement rate and a calibration rate based on the measured temperature is determined. A signal representing the at least one of the determined temperature measurement rate and the determined calibration rate is transmitted.

21 Claims, 4 Drawing Sheets

SYSTEM AND METHOD FOR DYNAMIC ADJUSTMENT OF CLOCK CALIBRATION

TECHNICAL FIELD

The present disclosure relates generally to mobile communication devices, and more particularly to a system and method for dynamically adjusting clock calibration in mobile communication devices.

BACKGROUND

In a microprocessor-based system used in a mobile device, a main system clock is typically used to synchronize the operation of various circuits within the mobile device with each other. The main system clock is also typically synchronized with the mobile device's communication network. Typically, the main system clock consumes a large amount of device power, shortening the battery life of the mobile device. To conserve battery life, the mobile device may enter a sleep mode when not in use. In sleep mode, the main system clock is temporarily disabled. The time reference for the device may be switched to another clock that runs at a lower frequency and hence consumes less power than the main system clock.

The real time clock typically has lower accuracy and may be sensitive to the operating temperature. To correct this fluctuation, the real time clock is typically calibrated against a reference frequency, such as the main system clock, periodically. This calibration may provide an estimation of the expected drift of the real time clock during the sleep mode of the main system clock. However, there might be a significant temperature change between the time at which the drift estimation for the calibration is performed and the time that the drift is actually corrected using the estimation. This may result in an incorrect estimation of the time elapsed at the end of the sleep period, which may result in incorrect synchronization between the device and the network.

It would be desirable to provide a way to calibrate the real time clock, taking into account such temperature fluctuations.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Figure 1:
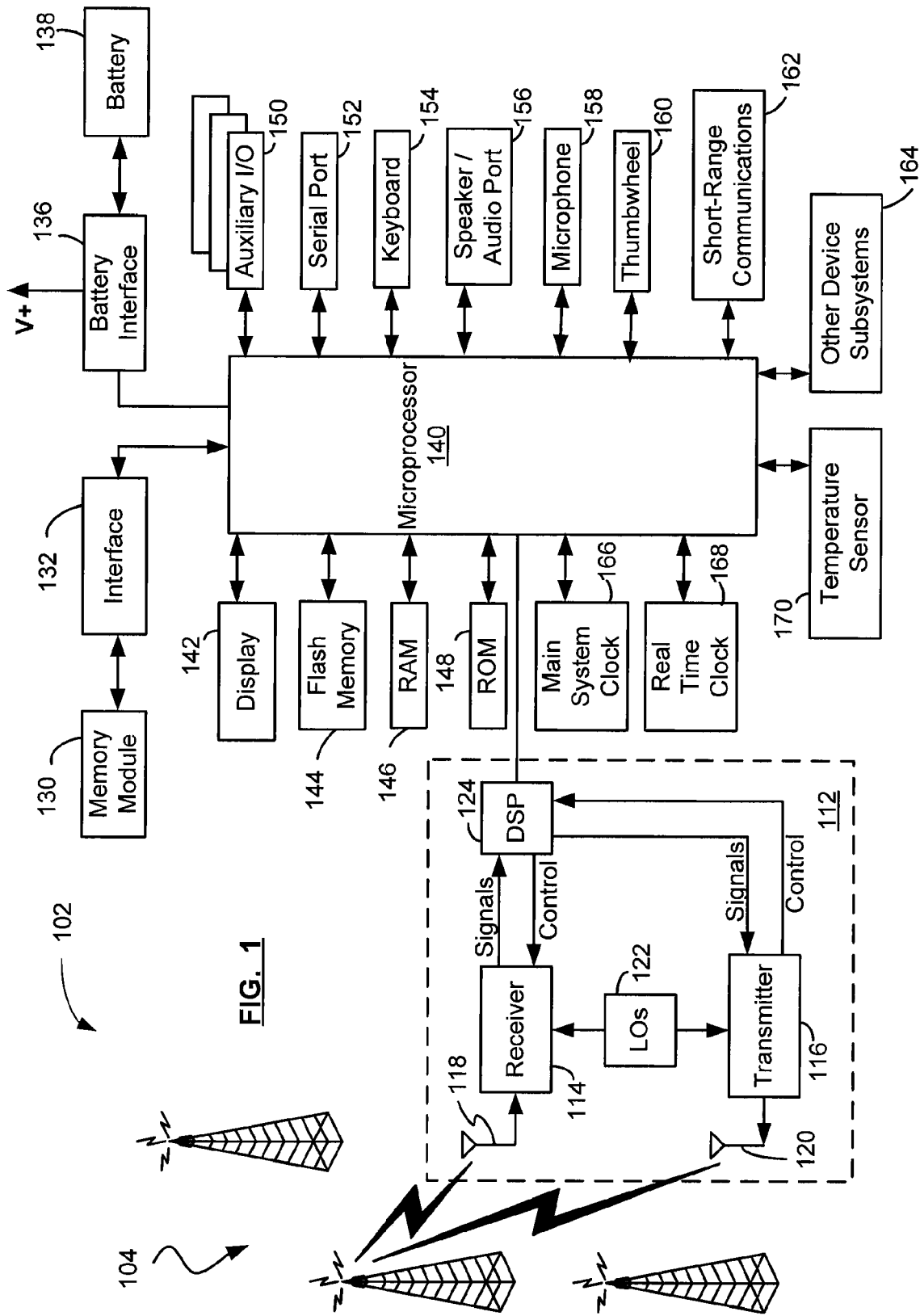
FIG. 1 shows in block diagram form a wireless device suitable for providing dynamic adjustment of clock calibration in accordance with an example embodiment.

In some aspects there is provided a system for dynamically adjusting clock calibration in a wireless communication device, the system comprising: a microprocessor for controlling operation of the wireless communication device; a temperature sensor for measuring a temperature; a primary clock coupled to the microprocessor for synchronizing the operation of the wireless communication device; a secondary clock coupled to the microprocessor for tracking time; and a memory coupled to the microprocessor; the memory including a dynamic adjustment module resident for execution by the microprocessor, the dynamic adjustment module being configured to: receive a signal representing a measured temperature; determine at least one of a temperature measurement rate and a calibration rate based on the measured temperature; and transmit a signal representing the at least one of the determined temperature measurement rate and the determined calibration rate.

In some aspects, there is provided a method for dynamically adjusting clock calibration in a wireless communication device having a temperature sensor and a real time clock, the method comprising: receiving a signal representing a measured temperature; determining at least one of a temperature measurement rate and a calibration rate based on the measured temperature; and transmitting a signal representing the at least one of the determined temperature measurement rate and the determined calibration rate.

In some aspects, there is provided a computer program product having a computer readable medium tangibly embodying computer executable instructions recorded thereon for dynamically adjusting clock calibration in a wireless communication device, the computer executable instructions comprising: code for receiving a signal representing a measured temperature; code for determining at least one of a temperature measurement rate and a calibration rate based on the measured temperature; and code for transmitting a signal representing the at least one of the determined temperature measurement rate and the determined calibration rate.

In the system, method and computer program product described above, determining at least one of the temperature measurement rate and the calibration rate may comprise: retrieving the at least one of the temperature measurement rate and the calibration rate from a look-up table using the measured temperature.

The present disclosure describes a system and method for dynamic adjustment of clock calibration in a mobile device.

Existing devices typically take temperature measurements and perform clock calibration at fixed time periods. This may have been adequate in the past, since the temperature the clock is exposed to would not be expected to change significantly between wake-up times. In the past, the main cause of temperature fluctuations at the clock may be changes in ambient temperatures, and typically the ambient temperature would not be expected to cause changes of two or three degrees between wake-up times, which may be around 1 s apart.

However, in newer device design and layout, the clock may be located in greater proximity with heat sources in the device, such as the power amplifier. Such layouts may be designed to minimize the size of the device.

Reference is first made to FIG. 1, which shows a block diagram illustrating a wireless device 102, such as a wireless communication device, suitable for dynamic adjustment of clock calibration in accordance with an example embodiment of the present disclosure. It will be understood that references to a mobile communication device, a wireless communication device, or a wireless device in this disclosure may also refer to any mobile device that requires periodic clock calibration. Although the wireless device 102 is provided as an example, the present disclosure may also be suitable for a digital signal processor (DSP) or other processor independent of the wireless device 102. The wireless device 102 may communicate through a wireless communication network 104. The wireless network 104 may include antennae, base stations, and supporting radio equipment as for supporting wireless communications between the wireless device 102 and other devices connected to wireless network 104. The wireless network 104 may be coupled to a wireless network gateway and to a wide area network, shown in FIG. 2.

In an example embodiment, the wireless device 102 may be a two-way mobile communication device having at least voice and/or data communication capabilities, including the capability to communicate with other computer systems. Depending on the functionality provided by the wireless device 102, it may be referred to as a data messaging device, a two-way pager, a cellular telephone with data messaging capabilities, a wireless Internet appliance, or a data communication device (with or without telephony capabilities). The wireless device 102 may communicate with any one of a plurality of fixed transceiver stations within its geographic coverage area.

The wireless device 102 may incorporate a communication subsystem 112, which may include a receiver 114, a transmitter 116, and associated components, such as one or more antenna elements 118 and 120, local oscillators (LOs) 122, and a processing module such as a digital signal processor (DSP) 124. In an example embodiment, the antenna elements 118 and 120 may be embedded or internal to the wireless device 102. As will be apparent to those skilled in the field of communications, the particular design of the communication subsystem 112 may depend on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 may be input to the receiver 114, which may perform such common receiver functions as signal amplification, frequency down conversion, filtering, channel selection, etc., as well as analog-to-digital (A/D) conversion. A/D conversion of a received signal may allow more complex communication functions such as demodulation and decoding to be performed in the DSP 124. In a similar manner, signals to be transmitted may be processed, including modulation and encoding, for example, by the DSP 124. These DSP-processed signals may be input to the transmitter 116 for digital-to-analog (D/A) conversion, frequency up conversion, filtering, amplification, and transmission to the wireless network 104 via the antenna 120. The DSP 124 may not only process communication signals, but may also provide for receiver and transmitter control. For example, the gains applied to communication signals in the receiver 114 and the transmitter 116 may be adaptively controlled through automatic gain control algorithms implemented in the DSP 124.

Network access may be associated with a subscriber or user of the wireless device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card may be inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 may also include a battery interface 136 for receiving one or more rechargeable batteries 138. The battery 138 may provide electrical power to at least some of the electrical circuitry in the wireless device 102, and the battery interface 136 may provide a mechanical and electrical connection for the battery 138. The battery interface 136 may be coupled to a regulator (not shown) which provides power V+ to the circuitry of the wireless device 102.

The wireless device 102 may include a microprocessor 140 which controls the overall operation of the wireless device 102. Communication functions, including at least data and voice communications, may be performed through the communication subsystem 112. The microprocessor 140 may also interact with additional device subsystems such as a display 142, a flash memory 144, a random access memory (RAM) 146, a read-only memory (ROM) 148, auxiliary input/output (I/O) subsystems 150, a data port such as serial port 152, a keyboard or keypad 154, a speaker or audio port 156 for connecting to, for example a set of headphones or an earpiece, a microphone 158, a clickable thumbwheel or thumbwheel 160, a short-range communications subsystem 162, and any other device subsystems generally designated as 164. Some of the subsystems shown in FIG. 1 may perform communication-related functions, whereas other subsystems may provide "resident" or on-device functions. Notably, some subsystems, such as the keypad 154, the display 142, and the clickable thumbwheel 160, for example, may be used for both communication-related functions, such as displaying notifications or entering a text message for transmission over the wireless network 104, and executing device-resident functions such as a real-time clock, a calculator or a task list. Operating system software used by the microprocessor 140 may be stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, may enable execution of software applications on the wireless device 102. A predetermined set of applications that control basic device operations, including data and voice communication applications, may normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications may have the ability to send and receive data items via either the wireless network 104 or a link to a computer system. The link to the computer system may be via the serial port 152 or the short-range communications subsystem 162. In an example embodiment, PIM and/or media data items may be seamlessly combined, synchronized, and updated via the wireless network 104, with the wireless device user's corresponding data items stored and/or associated with a host computer system thereby creating a mirrored or partially mirrored host computer on the wireless device 102 with respect to such items. This may be useful where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation may increase the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download may be processed by the communication subsystem 112 and input to the microprocessor 140. The microprocessor 140 may further process the signal for output to the display 142, or alternatively to the auxiliary I/O device 150. A user of the wireless device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad. These composed items may be transmitted through the communication subsystem 112 over the wireless network 104 or via the short range communication subsystem 162.

For voice communications, the overall operation of the wireless device 102 may be similar, except that the received signals may be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output may be typically accomplished primarily through the speaker or audio port 156, the display 142 may also be used to provide an indication of the identity of a calling party, duration of a voice call, or other voice call related information. Stereo headphones or an earpiece may also be used in place of the speaker 156.

The serial port 152 may be normally implemented in a personal digital assistant (PDA) type communication device for which synchronization with a user's computer may be a desirable, albeit optional, component. The serial port 152 may enable a user to set preferences through an external device or software application and extends the capabilities of the wireless device 102 by providing for information or software downloads to the wireless device 102 other than through the wireless network 104. The alternate download path may, for example, be used to load software or data files onto the wireless device 102 through a direct, reliable and trusted connection.

The short-range communications subsystem 162 may be an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another example embodiment, the short-range communications subsystem 162 may be a wireless networking communications subsystem, conforming to IEEE 802.11 standards such as one or more of 802.11b, 802.11g, or 802.11n.

The wireless device 102 may include a primary clock 166, such as a main system clock, and a secondary clock 168, such as a real-time clock. The primary clock 166 may also serve as a real-time clock in some examples. The primary clock 166 may generate a primary clock signal that may be used to synchronize the operations of other components and circuits of the wireless device 102, including those discussed above. The signal from the primary clock 166 may also synchronize the wireless device 102 with the wireless network 104. Maintaining correct synchronization between the wireless device 102 and the wireless network 104 may ensure that the wireless device 102 does not miss any signals (e.g., an incoming call) from the wireless network 104. The secondary clock 168 may generate a secondary clock signal that may keep track of the current time or "real" time, which may be used as a general time reference during intervals of sleep mode. The secondary clock 168 typically consumes less power than the primary clock 166 and may be powered by an alternate or backup power source (not shown) separate from the battery 138. The primary clock 166 may use a crystal oscillator at a frequency of about 26 MHz while the secondary clock 168 may use a crystal oscillator at a frequency of about 32 kHz, for example where the wireless device 102 is a GSM-enabled device.

In order to conserve power in the battery 138, the wireless device 102 may enter a sleep mode when not in use. When the wireless device 102 is in sleep mode, power to unneeded components, such as the display 142, may be cut. Power to the primary clock 166 and the microprocessor 140 may also be cut, since these components typically are among those that consume significant power. However, since the secondary clock 168 typically consumes less power than the primary clock 166, power to the secondary clock 168 typically is maintained. In sleep mode, the clock signal from the secondary clock 168 may be used to maintain basic functions such as keeping track of the current time. While in sleep mode, the primary clock 166 and the microprocessor 140 typically wake up at certain intervals to maintain synchronization with the wireless network 104 and to check for signals from the wireless network 104.

The primary clock 166 is typically more accurate and less prone to frequency drift than the secondary clock 168. Frequency drift of the secondary clock 168 is typically dependent on the temperature to which the secondary clock 168 is exposed. A temperature sensor 170 may be located at or near the secondary clock 168 for measuring the temperature to which the secondary clock is exposed. The temperature sensor 170 may generate a signal representing or indicating a measured temperature. The temperature measurement from the temperature sensor 170 may be used for clock calibration, as will be described in further detail below. The temperature sensor 170 may be a separate component or may be provided as part of the secondary clock 168.

Figure 2:
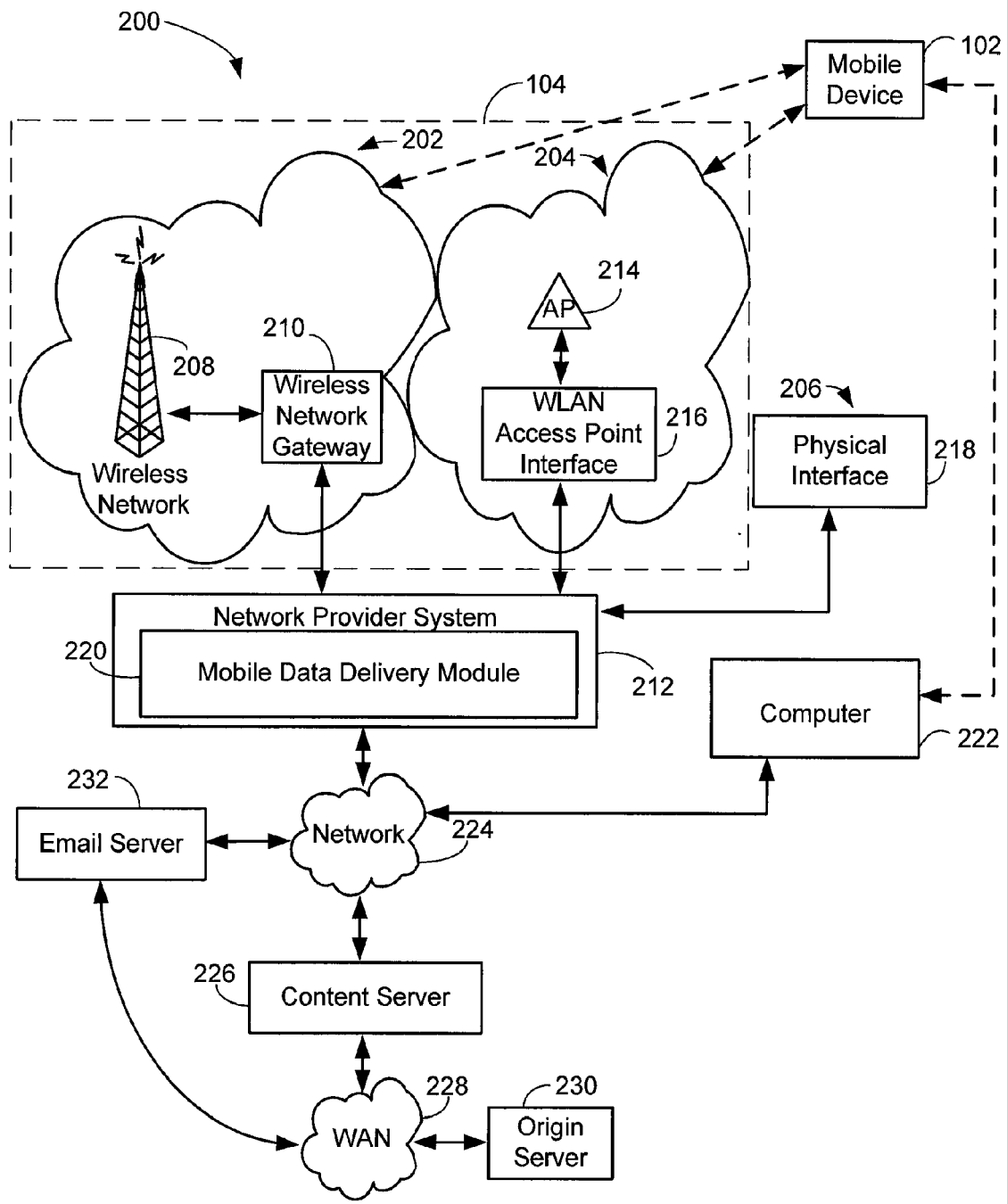
FIG. 2 shows in block diagram form a communication system suitable for providing the operating environment of the wireless device of FIG. 1 in accordance with an example embodiment.

Reference is next made to FIG. 2, which shows a communication system 200 suitable for use with the wireless device 102 shown in FIG. 1. The communication system 200 generally may include one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 may be typically operated by a cellular network service provider that sells subscription packages to users of the wireless devices 102. The wireless WAN 202 may comprise a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 may also include a wireless network gateway 210 and one or more network provider systems 212. The wireless network gateway 210 may provide translation and routing services between the network provider system(s) 212 and the WAN 202, which may facilitate communication between the wireless devices 102 and other devices (not shown) connected, directly or indirectly, to the network provider system 212.

The WLAN 204 may comprise a network which in some examples conforms to IEEE 802.11 standards such as one or more of 802.11b, 802.11g, or 802.11n; however, other communications protocols may also be used for the WLAN 204. The WLAN 204 may include one or more wireless RF Access Points (AP) 214 (one of which is shown in FIG. 2) that collectively provide a WLAN coverage area. For the example embodiment depicted in FIG. 2, the WLAN 204 may be operated by an enterprise (for example, a business or university in a building or campus type environment) and the access points 214 may be connected to an access point (AP) interface 216. The AP interface 216 may provide translation and routing services between the access points 214 and the network provider system 212 to facilitate communication between two or more of the wireless devices 102 and other devices (e.g., such as desktop computers) connected, directly or indirectly, to the network provider system 212. The AP interface 216 may be implemented using a computer, for example, a server running a suitable computer program or software.

According to an example embodiment, the other interfaces 206 may be implemented using a physical interface indicated by reference 218. The physical interface 218 may include an Ethernet, Universal Serial Bus (USB), Firewire, or infrared (IR) connection implemented to exchange information between the network provider system 212 and the wireless device 102.

The network provider system 212 may comprise a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 may provide access for the wireless devices 102, through either the wireless WAN 202, the WLAN 204, or the other connection 206 to the devices connected, for example, through an enterprise network 224 (e.g., an intranet), to the network provider system 212. In an example embodiment, the data delivery module 220 may be implemented on a computer, such as the network provider system 212.

The enterprise network 224 may comprise a local area network, an intranet, the Internet, a direct connection, or combinations thereof. The enterprise network 224 may comprise an intranet for a corporation or other type of organization. In at least some example embodiments, the network provider system 212 may be part of the enterprise network 224, and may be located behind a corporate firewall and connected to the wireless network gateway 210 through the Internet. A computer 222 (e.g., a desktop or laptop computer) belonging to the user of the wireless device 102 may be connected to the enterprise network 224. As described earlier, the wireless device 102 can be temporarily and directly connected to the computer 222 using, for example, the serial port 152. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some example embodiments, an email server 232 and/or the content server 226 may form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an example embodiment, the mobile data delivery module 220 may provide connectivity between the wireless WAN 202 and the WLAN 204 and the other connection 206 and devices and/or networks connected directly or indirectly to the network provider system 212. In an example embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
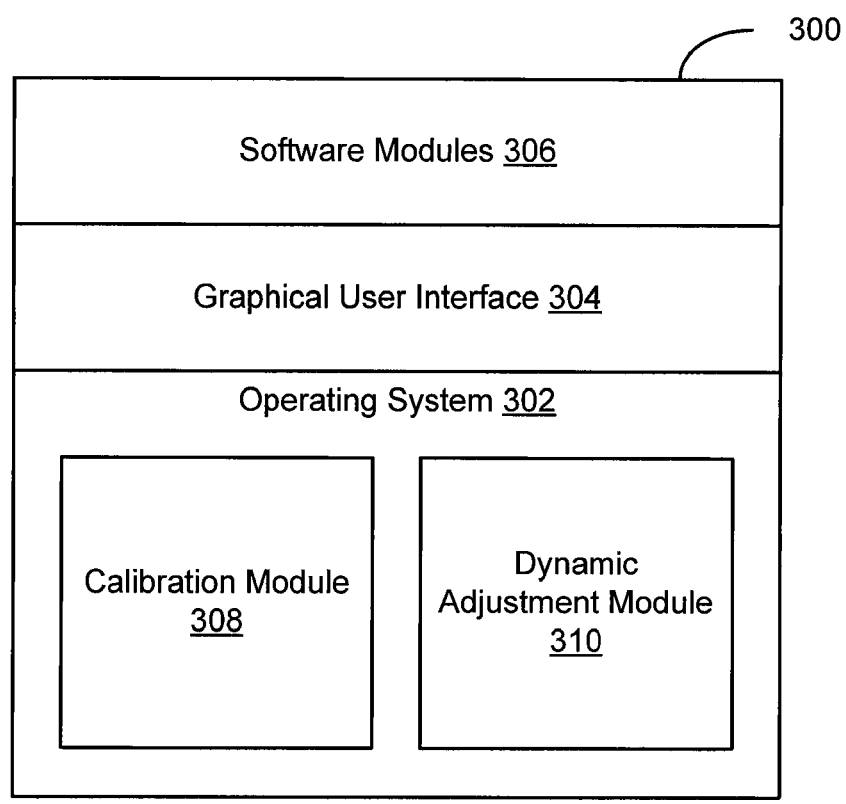
FIG. 3 shows in block diagram form modules of the wireless device of FIG. 1.

Reference is next made to FIG. 3, which shows a block diagram illustrating software modules 306 of the wireless device 102. These software modules 306 may reside in a memory 300, which may have various software components for controlling the wireless device 102 and may include, for example, the flash memory 144, the RAM 146, the ROM 148, the memory module 130 and/or the other device subsystems 164. In accordance with an example embodiment, the wireless device 102 may be a multi-tasking mobile communication device for sending and receiving data items, such as instant messages, for making and receiving voice calls, and for creating events and alerts. To provide a user-friendly environment to control the operation of the wireless device 102, an operating system (OS) 302 may be resident on the wireless device 102 for providing a basic set of operations for supporting various applications typically operable through a primary user interface such as a graphical user interface (GUI) 304.

The OS 302 may comprise a calibration module 308 for calibrating the primary clock 166 and/or the secondary clock 168. This calibration may be based on temperature measurements from the temperature sensor 170, as will be described in further detail below. The OS 302 may also include a dynamic adjustment module 310 for dynamically adjusting parameters used by the calibration module 308, as will be described in further detail below. Although the dynamic adjustment module 310 is shown separate from the calibration module 308, the dynamic adjustment module 310 may be included as part of the calibration module 308. One or more software modules 306 for managing communications or providing other functions may also be included. Although the calibration module 308 and the dynamic adjustment module 310 are shown as being part of the OS 302, the calibration module 308 and/or the dynamic adjustment module 310 may reside in other components of the wireless device 102, outside of the OS 302.

The memory 300 may also include an email and calendar client, which may be combined in, for example, a PIM application having email-based calendaring and scheduling functions. Typically, the PIM may be installed as one of the software modules 306. The calibration module 308 and the dynamic adjustment module 310 may be included among the software modules 306. Thus, the wireless device 102 may include computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) having computer executable instructions tangibly recorded thereon, which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

The secondary clock 168 may be susceptible to frequency drift dependent on the temperature to which it is exposed. The secondary clock 168 may be designed to have a target frequency at a target temperature and may drift from the target frequency as the temperature deviates from the target temperature. For example, where the secondary clock 168 is a real time clock with a frequency of about 32 kHz, the secondary clock 168 may display a frequency over temperature curve that is roughly parabolic and centered around a target temperature of 25° C. This means that the secondary clock 168 is closest to or at its target frequency, in this example 32 kHz, at its target temperature, in this example 25° C., and non-linearly drifts from the target frequency as the temperature deviates, either higher or lower, from 25° C. Typically, greater temperature deviations from the target temperature, either higher or lower, results in greater frequency drift. This drift may be significant when the wireless device 102 is in sleep mode, during which time only the secondary clock 168 is constantly active.

In sleep mode, the primary clock 166 may be reactivated at certain intervals, for example about every 1 s, in order to allow the wireless device 102 to synchronously receive signals from the wireless network 104. However, the reactivation time intervals may be determined based on the secondary clock 168. If the secondary clock 168 is inaccurate due to frequency drift, the primary clock 166 may reactivate at an incorrect time, with the result that synchronization with the wireless network 104 may fail. For example, a frequency drift of as little as 3 or 4 GSM quarter bits over 1 s, equivalent to a drift of about 4 μs, when repeated as little as 5 times, may be sufficient to result in a failed synchronization with the wireless network 104. Typically, calibration occurs at intervals during the awake periods (i.e., outside of sleep mode), to ensure that the secondary clock 168 is calibrated in sleep mode.

To correct for the frequency drift of the secondary clock 168, the calibration module 308 may carry out a calibration of the secondary clock 168 against the primary clock 166. This may be carried out using common calibration algorithms.

Existing calibration and/or frequency drift correction methods typically assume that temperature fluctuations at the secondary clock 168 are gradual. For example, the ambient temperature typically is not expected to change by more than 0.5° C. over the time of 1 s. Such an assumption allows the implementation of methods where temperature measurement rates and are fixed, since it would be expected that temperature changes in the fixed intervals of time between temperature measurements would be within acceptable tolerances. With similar reasoning, calibration rates are typically also fixed. However, as wireless devices are designed with smaller sizes, the circuitry used must also be designed to fit a smaller layout, with the result that components that were previously relatively far apart may be brought closer together. With such a design, heat generating components, such as the power amplifier, may be brought into close proximity with temperature sensitive components, such as the real time clock. The result may be that the temperature sensitive components become exposed to internal temperature changes that are significant over even a very small interval of time. For example, if the wireless device is used to receive a telephone call, the power amplifier is on and generates heat during the call. Once the call ends, the power amplifier is off and the internal temperature may rapidly drop, for example by as much as 2° C. over 1 s. This maybe a significant change in the temperature to which the real time clock is exposed. Existing calibration method may be unable to take such temperature fluctuations into consideration. While it may be possible to address this problem simply by performing temperature measurements and calibrations more frequently, such a solution may also increase processing demands, thus draining system resources such as processing power and battery power.

Figure 4:
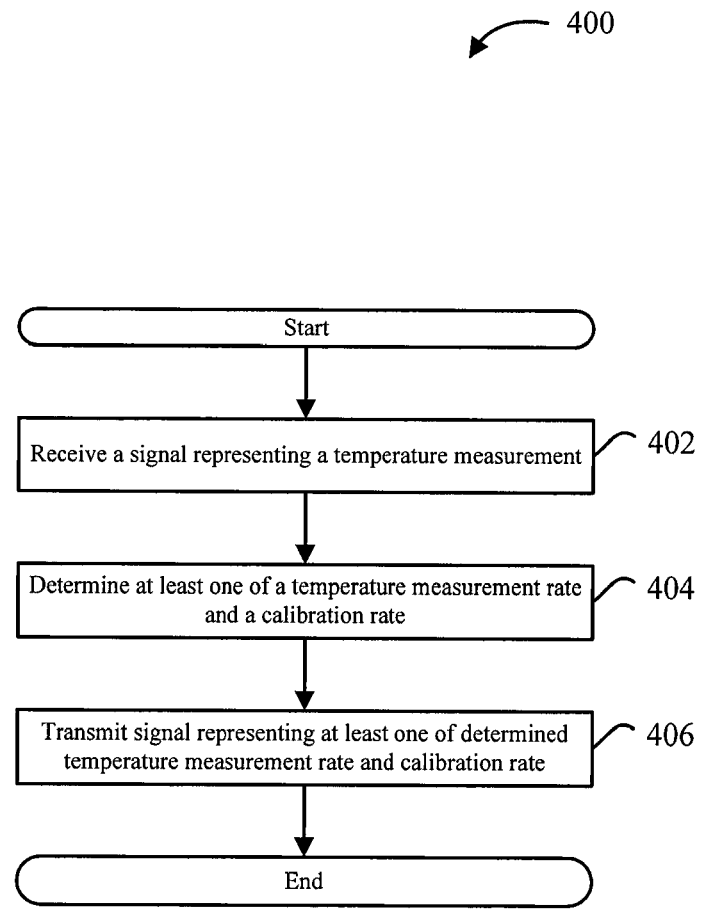
FIG. 4 is a flowchart illustrating a general method of dynamic adjustment of clock calibration in accordance with an example embodiment.

Reference is now made to FIG. 4, showing a flowchart illustrating a general method 400 for dynamic adjustment of clock calibration in a mobile device.

The method 400 may be performed when the wireless device 102 is outside of sleep mode. The method 400 may also be performed immediately prior to the wireless device 102 entering sleep mode. The wireless device 102 may be preset with an initial calibration rate and initial temperature measurement rate, for performing the first instance of calibration and temperature measurement, such as when the wireless device 102 is first powered on. This initial calibration rate and initial temperature measurement rate may be set at the time of manufacturing. After the first calibration and first temperature measurement, subsequent calibration and temperature measurements may take place according to dynamically adjusted rates, as described below.

At 402, a signal representing a temperature measurement is received, for example at the dynamic adjustment module 310. The temperature may be measured by the temperature sensor 170, which may generate a signal representing the measured temperature. The temperature may be measured according to a previously-determined temperature measurement rate until the rate is adjusted. Where the wireless device 102 is first entering sleep mode, the temperature may be measured prior to entering sleep mode and subsequently according to the initial temperature measurement rate until the rate is adjusted.

At 404, at least one of a temperature measurement rate and a calibration rate is determined using the measured temperature. This may be at the dynamic adjustment module 310. In some example embodiments, the determination may be based on reference to a look-up table stored in the dynamic adjustment module 310. The look-up table may provide information of a suitable temperature measurement rate and a suitable calibration rate for the measured temperature. Although the temperature measurement rate and the calibration rate may be determined together using the measured temperature, the temperature measurement rate and the calibration rate may also be determined independent of each other.

Typically, the greater the measured temperature deviates from the target temperature (e.g., 25° C.), the greater the frequency drift per ° C. As such, at measured temperatures having greater deviations from the target temperature, the look-up table may indicate that a higher temperature measurement rate and a higher calibration rate would be suitable, to account for the greater drift. Conversely, if the measured temperature deviates little from the target temperature, the look-up table may indicate that a lower temperature measurement rate and a lower calibration rate would be suitable.

The look-up table may be based on both empirical and calculated data. For example, the look-up table may incorporate known data about the characteristics of the crystal oscillator for the secondary clock 168 as well as calculated data about the temperature measurement and calibration rates. Typically, the look-up table may indicate the lowest suitable temperature measurement rate and the lowest suitable calibration rate in order to reduce demands on system resources, such as processing power and battery power. The look-up table may use known characteristics of the crystal oscillator to calculate a maximum drift that may occur during a sleep period. Based on this calculated information, the suitable temperature measurement rate and the suitable calibration rate may be determined and stored in the look-up table. Additionally, empirical data, such as how fast the temperature may change, may also be used to determine the suitable rates stored in the look-up table.

At 406, a signal representative of at least one of the determined temperature measurement rate and the determined calibration rate is transmitted. The signal may be transmitted by the dynamic adjustment module 310 and may be received by other modules in the device, such as the calibration module 308, to dynamically adjust the rate of temperature measurement and the rate of calibration, to better account for clock drift due to temperature fluctuations.

The method 400 may repeat when a signal representing a temperature measurement is next received. This may be the next time the temperature is measured.

When the wireless device 102 receives a signal to enter sleep mode (e.g., in response to the user turning off the device or when the wireless device 102 is placed into its holster), the wireless device 102 may first check that the calibration of the secondary clock 168 is current. This may be done, for example, by checking a stored flag or indicator, which may be stored and set by the calibration module 308. For example, during calibration (e.g., when determining updated temperature measurement rate and calibration rate), the calibration module 308 may set the flag or indicator to indicate that the calibration is not current. When calibration is complete, the calibration module 308 may set the flag or indicator to indicate that the calibration is current, until the next calibration is carried out. If the calibration is not current when the signal to enter sleep mode is received, the wireless device 102 may wait until the calibration is current before entering sleep mode.

The method 400 may allow the temperature measurement rate and calibration rate to be dynamically adjusted based on the measured temperature. This may be useful over fixed rates, because the frequency drift of the secondary clock 168 may be non-linear with temperature. Thus, when the secondary clock 168 is exposed to temperatures that are much higher or much lower than the target temperature, a temperature change of 1° C. may cause much more frequency drift than if the secondary clock 168 is exposed to temperature are only slightly different from the target temperature. This means that at certain temperatures (e.g., temperatures much higher than the target temperature), the temperature measurement rate and calibration rate may be higher, to account for greater possible frequency fluctuations, while at other temperatures (e.g., temperatures very close to the target temperature), the temperature measurement rate and calibration rate may be lower, since frequency fluctuations are expected to be slight. By dynamically adjusting the temperature measurement rate and calibration rate in this manner, frequency drifts may be accounted for while keeping temperature measurement and calibration processes to a minimal, to conserve system resources.

While the steps of the method 400 are shown as occurring in a particular order, it will be appreciated by those skilled in the art that many of the steps are interchangeable and may occur in different orders than that shown without materially affecting the end results of the method 400. Additionally, while dynamic adjustment is described as principally occurring within the dynamic adjustment module 310, it will be understood by those skilled in the art that a module or modules similar to the dynamic adjustment module 310 may be implemented as part of the other software modules on the wireless device. Similarly, calibration may be carried out by module or modules other than the calibration module 308. The steps described may be carried out by a single module or may be carried out by several different modules.

While the present disclosure refers to a the use of a clickable thumbwheel 160, a trackball 160b, a keyboard 154, an input device, or similar navigation and input mechanisms for navigation on a wireless device 102, it will be appreciated by those skilled in the art that navigation, input or both may be provided by the use of a touchscreen display. The display 142 may be a touchscreen display. Navigation or input on a touchscreen display may be by contacting the display directly with fingers, or by using a stylus or a similar pointing device.

While the present disclosure is primarily described as a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium or storage medium including program instructions tangibly recorded thereon, or a computer data signal carrying computer readable program instructions may direct an apparatus to facilitate the practice of the disclosed method. It is understood that such apparatus, articles of manufacture, and computer data signals also come within the scope of the present disclosure.

The example embodiments of the present disclosure described above are intended to be examples only. Those of skill in the art may effect alterations, modifications and variations to the particular example embodiments without departing from the intended scope of the present disclosure. In particular, selected features from one or more of the above-described example embodiments may be combined to create alternative example embodiments not explicitly described, features suitable for such combinations being readily apparent to persons skilled in the art. The subject matter described herein in the recited claims intends to cover and embrace all suitable changes in technology.

The invention claimed is:

1. A system for dynamically adjusting clock calibration in a wireless communication device, the system comprising:
 a microprocessor for controlling operation of the wireless communication device;
 a temperature sensor for measuring temperature;
 a primary clock coupled to the microprocessor for synchronizing the operation of the wireless communication device; and
 a secondary clock coupled to the microprocessor for tracking time;
 the microprocessor being configured to:
  determine a temperature measurement time interval for obtaining measured temperatures from the temperature sensor and a clock calibration time interval for calibrating the secondary clock by:
   receiving a measured temperature from the temperature sensor;
   determining an update to the temperature measurement time interval and the clock calibration time interval, based on the measured temperature; and
   adjusting the temperature measurement time interval and the clock calibration time interval according to the determined update.

2. The system of claim 1 wherein the microprocessor is further configured to:
 receive a signal to bring the wireless communication device into a sleep mode;
 determine whether calibration of the secondary clock is current; and
 upon determining that the calibration of the secondary clock is not current, send a signal to wait for calibration of the secondary clock to be current before entering sleep mode.

3. The system of claim 2 wherein the microprocessor is configured to determine whether calibration of the secondary clock is current by:
 checking a stored indicator of whether the calibration of the secondary clock is current.

4. The system of claim 1 wherein the microprocessor is further configured to:
 calibrate the secondary clock at the determined clock calibration time interval; and
 request a temperature measurement from the temperature sensor at the determined temperature measurement time interval.

5. The system of claim 4 wherein the secondary clock is calibrated against the primary clock.

6. The system of claim 1 wherein the wireless communication device is preset with an initial temperature measurement time interval and an initial clock calibration time interval, and the microprocessor is further configured to carry out a first instance of calibration of the secondary clock according to the initial clock calibration time interval and to request a first instance of temperature measurement from the temperature sensor according to the initial temperature measurement time interval.

7. The system of claim 1 wherein, for determining the update to the temperature measurement time interval and the clock calibration time interval, the microprocessor is further configured to:
 retrieve an update of at least one of the temperature measurement time interval and the clock calibration time interval from a look-up table using the measured temperature.

8. A method for dynamically adjusting clock calibration in a wireless communication device, the method comprising:
 determining a temperature measurement time interval for obtaining measured temperatures and a clock calibration time interval for calibrating a secondary clock by:
  receiving a measured temperature from the temperature sensor;
  determining an update to the temperature measurement time interval and the clock calibration time interval, based on the measured temperature; and
  adjusting the temperature measurement time interval and the clock calibration time interval according to the determined update.

9. The method of claim 8 further comprising:
 receiving a signal to bring the wireless communication device into a sleep mode;
 determining whether calibration of the secondary clock is current; and
 upon determining that the calibration is not current, sending a signal to wait for calibration of the secondary clock to be current before entering sleep mode.

10. The method of claim 9 wherein determining whether calibration of the secondary clock is current comprises:
 checking a stored indicator of whether the calibration of the secondary clock is current.

11. The method of claim 8 further comprising:
 calibrating the secondary clock at the determined clock calibration time interval; and
 requesting a temperature measurement at the determined temperature measurement time interval.

12. The method of claim 11 wherein the secondary clock is calibrated against a primary clock.

13. The method of claim 8 wherein the wireless communication device is preset with an initial temperature measurement time interval and an initial clock calibration time interval, and a first instance of calibration of the secondary clock is carried out according to the initial clock calibration time interval and a first instance of temperature measurement is requested according to the initial temperature measurement time interval.

14. The method of claim 8 wherein determining the update to the temperature measurement time interval and the clock calibration time interval comprises:
 retrieving an update of at least one of the temperature measurement time interval and the clock calibration time interval from a look-up table using the measured temperature.

15. A non-transitory computer program product having a computer readable medium tangibly embodying computer executable instructions recorded thereon for dynamically adjusting clock calibration in a wireless communication device, the computer executable instructions comprising:
 code for determining a temperature measurement time interval for obtaining measured temperatures and a clock calibration time interval for calibrating a secondary clock by:
  receiving a measured temperature from the temperature sensor;
  determining an update to the temperature measurement time interval and the clock calibration time interval, based on the measured temperature; and adjusting the temperature measurement time interval and the clock calibration time interval according to the determined update.

16. The computer program product of claim 15 further comprising:
   code for receiving a signal to bring the wireless communication device into a sleep mode;
   code for determining whether calibration of the secondary clock is current; and
   code for, upon determining that the calibration of the secondary clock is not current, sending a signal to wait for calibration of the secondary clock to be current before entering sleep mode.

17. The computer program product of claim 16 wherein code for determining whether calibration of the secondary clock is current comprises:
   code for checking a stored indicator of whether the calibration of the secondary clock is current.

18. The computer program product of claim 15 further comprising:
   code for calibrating the secondary clock at the determined clock calibration time interval; and
   code for requesting a temperature measurement at the determined temperature measurement time interval.

19. The computer program product of claim 18 wherein the secondary clock is calibrated against a primary clock.

20. The computer program product of claim 15 wherein the wireless communication device is preset with an initial temperature measurement time interval and an initial clock calibration time interval, and a first instance of calibration of the secondary clock is carried out according to the initial clock calibration time interval and a first instance of temperature measurement is requested according to the initial temperature measurement time interval.

21. The computer program product of claim 15 wherein determining the update to the temperature measurement time interval and the clock calibration time interval comprises:
   retrieving an update of at least one of the temperature measurement time interval and the clock calibration time interval from a look-up table using the measured temperature.

* * * * *